(12) United States Patent
Lee et al.

(10) Patent No.: US 9,143,641 B2
(45) Date of Patent: Sep. 22, 2015

(54) METHOD FOR SCANNING DATA AND ELECTRONIC DEVICE THEREOF

(71) Applicant: Samsung Electronics Co., Ltd., Gyeonggi-do (KR)

(72) Inventors: Kyung-Hee Lee, Gyeonggi-do (KR); Ki-Huk Lee, Gyeonggi-do (KR); So-Young Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/285,115

(22) Filed: May 22, 2014

(65) Prior Publication Data

US 2014/0347706 A1    Nov. 27, 2014

(30) Foreign Application Priority Data

May 23, 2013   (KR) ................ 10-2013-0058441

(51) Int. Cl.
*H04N 1/04* (2006.01)
*H04N 1/00* (2006.01)
*H04N 1/23* (2006.01)

(52) U.S. Cl.
CPC ....... *H04N 1/00381* (2013.01); *H04N 1/00249* (2013.01); *H04N 1/23* (2013.01)

(58) Field of Classification Search
CPC .. H04N 1/00381; H04N 1/23; H04N 1/00249
USPC .................. 358/474, 498, 497, 496, 1.15
See application file for complete search history.

(56) References Cited

U.S. PATENT DOCUMENTS

| | | | |
|---|---|---|---|
| 2002/0130839 A1* | 9/2002 | Wallace et al. | 345/157 |
| 2006/0284987 A1 | 12/2006 | Wolf, II | |
| 2007/0288670 A1* | 12/2007 | Lee | 710/104 |
| 2008/0237347 A1 | 10/2008 | Wolf | |
| 2012/0044546 A1 | 2/2012 | Wolf, II | |

FOREIGN PATENT DOCUMENTS

| | | |
|---|---|---|
| KR | 1020070096413 | 10/2007 |
| KR | 1020120061084 | 6/2012 |

* cited by examiner

*Primary Examiner* — Houshang Safaipour
(74) *Attorney, Agent, or Firm* — The Farrell Law Firm, P.C.

(57) ABSTRACT

A method for operating an electronic device is provided. The method includes detecting a touch of an external input device, determining at least one region associated with the detected touch, receiving scanning data from the external input device, and displaying the scanning data at the determined region.

20 Claims, 20 Drawing Sheets

MEANS FOR DETECTING TOUCH OF EXTERNAL INPUT DEVICE ~211

MEANS FOR DETERMINING COORDINATES OF THE DETECTED TOUCH ~213

MEANS FOR RECEIVING THE SCANNING DATA FROM EXTERNAL INPUT DEVICE ~215

MEANS FOR DISPLAYING THE SCANNING DATA AT THE DETERMINED TOUCH COORDINATES ~217

FIG.2B

METHOD FOR SCANNING DATA AND ELECTRONIC DEVICE THEREOF

PRIORITY

The present application claims priority under 35 U.S.C. §119(a) to a Korean Patent Application filed in the Korean Intellectual Property Office on May 23, 2013 and assigned Serial No. 10-2013-0058441, the entire content of which is incorporated herein by reference.

BACKGROUND

1. Field of the Invention

The present invention generally relates to electronic device, and more particularly, to a method and an electronic device for scanning data.

2. Description of the Related Art

Based on rapid development of electronic devices such as smart phones and tablet Personal Computers (PC), electronic devices allowing wireless voice communication and information exchange have become necessities in the life. As electronic device technologies advance and wireless Internet is adopted, the electronic device is developed from a portable device for simple phone call to a multimedia device for schedule management, games, remote control, and image capturing, to thus satisfy the user's needs.

Recently, the transparent display is applied to various electronic devices. The transparent display becomes transparent under user's control using a transparent electronic device to thus show a background behind the display. Applications of the transparent display capable of showing the background behind the display are also developed.

However, when scanning and outputting the data, the conventional method for scanning data using the transparent display is subject to a time gap between the data scanning and the data output and a gap between the data scanning point and the output point.

There is a need to enhance user convenience using characteristics of the transparent display when the data is scanned using the transparent display.

SUMMARY OF THE INVENTION

The present invention has been made to address at least the above problems and/or disadvantages and to provide at least the advantages described below. Accordingly, an aspect of the present invention is to provide a method and an apparatus for scanning data in an electronic device.

Another aspect of the present invention is to provide a method and an apparatus for displaying scanning data in a transparent display region contacting an external input device in an electronic device.

Another aspect of the present invention is to provide a method and an apparatus for transparently displaying a preset region of a transparent display in a scan mode of an electronic device.

Another aspect of the present invention is to provide a method and an apparatus for receiving data scanned by an external input device in real time in an electronic device.

Another aspect of the present invention is to provide a method and an apparatus for displaying data scanned by an external input device at coordinates of a detected touch in an electronic device.

According to an aspect of the present invention, a method for operating an electronic device is provided. The method includes detecting a touch of an external input device; determining region of the detected touch; receiving scanning data from the external input device; and displaying the scanning data at the determined touch region.

According to another aspect of the present invention, an apparatus for scanning data is provided. The apparatus includes one or more processors; a transparent touch display functionally connected to the one or more processors; a memory; and one or more programs stored in the memory and configured for execution by the one or more processors. The program includes instructions for detecting a touch of an external input device, determining region of the detected touch, receiving scanning data from the external input device, and displaying the scanning data at the determined touch region.

BRIEF DESCRIPTION OF THE DRAWINGS

The above and other aspects, advantages, and features of the present invention will become apparent to those skilled in the art from the following detailed description, taken in conjunction with the annexed drawings, in which:

FIG. 2B illustrates means for performing a method for scanning the data in the electronic device according to an embodiment of the present invention;

Throughout the drawings, like reference numerals will be understood to refer to like parts, components and structures.

DETAILED DESCRIPTION OF EMBODIMENTS OF THE PRESENT INVENTION

The following description with reference to the accompanying drawings is provided to assist in a comprehensive understanding of various embodiments of the present invention as defined by the claims and their equivalents. It includes various specific details to assist in that understanding but these are to be regarded as mere examples. Accordingly, those of ordinary skill in the art will recognize that various changes and modifications of the embodiments described herein can be made without departing from the scope and spirit of the present invention. In addition, descriptions of well-known functions and constructions may be omitted for clarity and conciseness.

The terms and words used in the following description and claims are not limited to meanings in a dictionary, but, are merely used to enable a clear and consistent understanding of the present invention. Accordingly, it should be apparent to those skilled in the art that the following description of various embodiments of the present invention is provided for illustration purposes only and not for the purpose of limiting the present invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skilled in the art, may occur in amounts that do not preclude the effect the characteristic was intended to provide.

Hereinafter, an electronic device can embrace a mobile communication terminal, a smart phone, a tablet Personal Computer (PC), a Moving Picture Expert Group (MPEG) audio Layer 3 (MP3) player, and a navigation device, capable of making a display panel transparent under a user's control.

Hereinafter, term of "region" may include coordinates. Also, term of "coordinates" may include region.

Figure 1A:
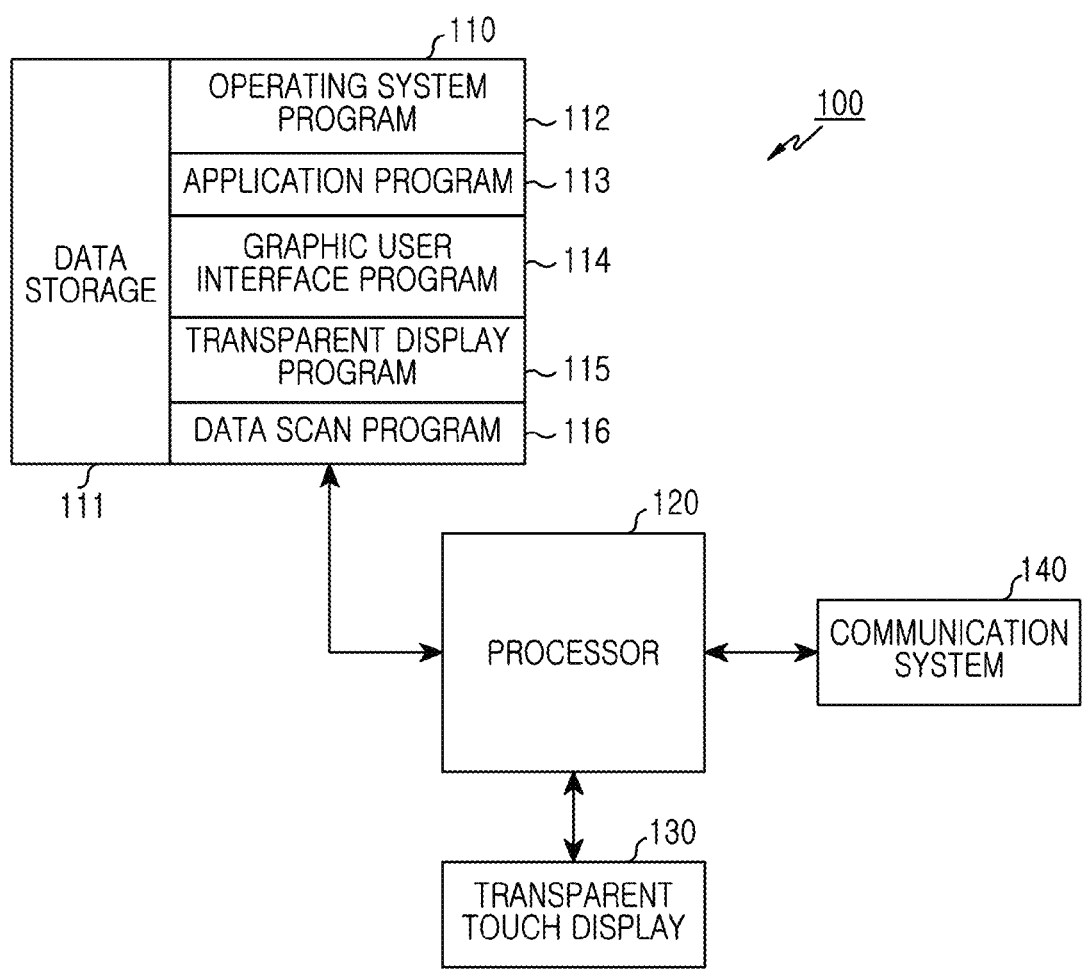
FIG. 1A illustrates a configuration of an electronic device for scanning data according to an embodiment of the present invention.

FIG. 1A is a block diagram of a configuration of an electronic device for scanning data according to an embodiment of the present invention.

Referring to FIG. 1A, the electronic device 100 includes a memory 110, a processor 120, and a transparent touch display 130. The electronic device 100 can include a plurality of memories 110 and a plurality of processors 120. The electronic device may further include a communication system 140.

The memory 110 includes a data storage 111, an operating system program 112, an application program 113, a graphic user interface program 114, a transparent display program 115, and a data scan program 116. Since the program being a software component can be represented as a set of instructions, the program may be referred to as an instruction set. The program may also be referred to as a module.

The memory 110 stores one or more programs including instructions for the present invention.

The data storage 111 stores data generated in function execution corresponding to the program stored in the memory 110. In a scan mode, the data storage 111 stores information about a transparent region of the transparent touch display 130 according to the running function. The transparent region varies according to the application and/or the function. For example, in the scan mode while running a web browser, the data storage 111 stores information indicating that a search word input window is transparent in the entire web browser region displayed. As another example, in the scan mode while running a launcher function, the data storage 111 stores information indicating that the whole region of the transparent touch display 130 is transparent.

The data storage 111 stores information of touch coordinates and touch area detected by an external input device. That is, when detecting the touch of the external input device in the scan mode, the data storage 111 stores the coordinate information and the touch area information of the detected touch. Further, the data storage 111 may store function information for determining a region for displaying the touch area or the scanning data based on the coordinates touched by the external input device. Here, the region for displaying the scanning data may be larger than or smaller than the touch area of the external input device.

The data storage 111 stores the scanning data received from the external input device. That is, the data storage 111 stores the scanning data received from the external input device through a communication system 140. The scanning data is data scanned by the external input device. For example, the data storage 111 stores text data received from the external input device through the communication system 140. As another example, the data storage 111 stores image data received from the external input device through the communication system 140.

The operating system program 112 (e.g., an embedded operating system such as WINDOWS, LINUX, Darwin, RTXC, UNIX, OS X, or VxWorks) includes various software components for controlling general system operations, which include software components of, e.g., memory management and control, storage hardware (device) control and management, and power control and management. The operating system program 112 processes normal communication between various hardware (devices) and software components (modules).

The application program 113 includes a browser, an e-mail, a message, a word processing, an address book, a widget, Digital Right Management (DRM), voice recognition, voice reproduction, a position determining function, a location based service, and a call application.

The graphic user interface program 114 includes various software components for providing a graphical user interface between a user and the electronic device 100. The graphic user interface program 114 includes at least one software component for displaying user interface information on the transparent touch display 130. The graphic user interface program 114 includes an instruction for displaying the scanning data received from the external input device at the coordinates of the detected touch. For example, the graphic user interface program 114 displays the image data received from the external input device at the coordinates of the detected touch. As another example, the graphic user interface program 114 displays the text data received from the external input device at the coordinates or in the area of the detected touch. As yet another example, the graphic user interface program 114 displays the text data or the image data received from the external input device in the display region determined by the touch coordinates.

The transparent display program 115 sets the scan mode of the electronic device 100 under the user control. For example, when a menu for setting the scan mode is selected, the transparent display program 115 sets the scan mode of the electronic device 100. As another example, when an application for setting the scan mode is executed, the transparent display program 115 sets the scan mode of the electronic device 100. As yet another example, when a gesture for setting the scan mode is detected, the transparent display program 115 sets the scan mode of the electronic device 100. As yet another example, when the touch of the external input device is detected in the transparent display area of the transparent display, the transparent display program 115 sets the scan mode of the electronic device 100.

In the scan mode of the electronic device 100, the transparent display program 115 can make the transparent touch display 130 transparent. Here, the transparency means that the background behind the transparent touch display 130 is clearly visible through a front side of the transparent touch display 130. In the scan mode, the transparent display program 115 can make a preset region of the transparent touch display 130 transparent. More specifically, in the scan mode, the transparent display program 115 can make the preset region of the transparent touch display 130 transparent according to the running application and/or function. For example, when the electronic device 100 is in the scan mode while running the web browser application, the transparent display program 115 can make the region corresponding to the search word input window transparent in the transparent touch display 130 displaying the web browser application screen. As another example, when the electronic device 100 is in the scan mode while running the launcher application, the transparent display program 115 can make the whole region of the transparent touch display 130 transparent.

When the electronic device 100 is in the scan mode, the transparent display program 115 can make the transparent touch display 130 translucent. Here, the translucency indicates an intermediate state between the transparent state where the background behind the transparent touch display 130 is clearly visible through the front side of the transparent touch display 130 and the opaque state where the background behind the transparent touch display 130 is invisible through the front side of the transparent touch display 130. In the scan mode, the transparent display program 115 can make the preset region of the transparent touch display 130 translucent. More specifically, in the scan mode, the transparent display program 115 can make the preset region of the transparent touch display 130 translucent according to the running application and/or function. For example, when the electronic device 100 is in the scan mode while running the web browser application, the transparent display program 115 can make the region corresponding to the search word input window translucent in the transparent touch display 130 displaying the web browser application screen. As another example, when the electronic device 100 is in the scan mode while running the launcher application, the transparent display program 115 can make the whole region of the transparent touch display 130 translucent.

When detecting the touch from the external input device, the data scan program 116 checks the coordinates of the detected touch region. When the electronic device 100 is in the scan mode and the touch of the external input device is detected in the transparent or translucent region, the data scan program 116 obtains the coordinates of the detected touch.

The data scan program 116 receives the scanning data from the external input device via the communication system 140. When the touch of the external input device is detected, the data scan program 116 receives the scanning data from the corresponding external input device using wireless communication currently connected to the electronic device 100. When the electronic device 100 is not currently connected to the external input device through the wireless communication, the data scan program 116 displays a wireless communication list of the available wireless communication networks for the current external input device.

When a particular wireless communication network is selected in the displayed wireless communication list, the data scan program 116 connects to the external input device over the selected wireless communication network and then receives the scanning data from the external input device. The data scan program 116 can connect the wireless communication by automatically selecting the wireless communication network based on preset priority of the wireless communication networks.

The data scan program 116 displays the scanning data received from the external input device, on the transparent touch display 130. More specifically, upon receiving the scanning data from the external input device, the data scan program 116 obtains the coordinates of the detected touch from the external input device and displays the received scanning data in the touch region corresponding to the obtained touch coordinates on the transparent touch display 130. The data scan program 116 can opaquely display the scanning data on the transparent touch display 130 which is transparent or translucent. Particularly, the data scan program 116 can determine whether the scan mode of the electronic device ends and continuously display the scanning data until the scan mode ends under the user control.

The data scan program 116 displays the scanning data in the display region determined by the touch coordinates detected from the external input device. That is, when detecting the touch from the external input device, the data scan program 116 obtains the coordinates of the corresponding touch, determines that a region within a threshold distance from the touched coordinates is to display the scanning data, and then displays the scanning data in the corresponding region. When the display region of the scanning data overlaps, the data scan program 116 displays the scanning data only once in the overlapping region. More specifically, the data scan program 116 displays first scanning data. To display second scanning data, the data scan program 116 then determines a first region which displays the first scanning data and a second region which is to display the second scanning data. Thus, the data scan program 116 determines whether the first region and the second region overlap with each other. The data scan program 116 displays at least one of the first scanning data and the second scanning data in the overlapping region.

The data scan program 116 can determine the scanning data received until the end of the detected touch, as one image. The data scan program 116 can determine the scanning data continuously received during the detected touch of the external input device, as one image. For example, when drag of the external input device is detected, the data scan program 116 determines the scanning data during the corresponding drag, as one image. The data scan program 116 controls to move, copy, paste, and delete the scanning data determined as one image.

The data scan program 116 can determine the scanning data received until a motion of the electronic device 100 is detected, as one image. More specifically, when no motion of the electronic device 100 is detected and the scanning data is continuously received, the data scan program 116 can determine the multiple scanning data received, as one image. For example, when the motion of the electronic device 100 is not detected until the touch of the external input device ends, the data scan program 116 determines the scanning data received until the motion of the electronic device 100 is detected, as one image. The electronic device 100 is assumed to include a sensor (i.e., a motion sensor) for detecting the motion of the electronic device 100.

When receiving size information of the scanning data from the external input device, the data scan program 116 displays the data based on the received size information. This is to make the size of data shown through the transparent touch display 130 identical with the size of data displayed on the transparent touch display 130.

The processor 120 includes at least one processor and a peripheral interface. The processor 120 can execute a particular program (instruction set) stored in the memory 110 and thus fulfill a plurality of particular functions corresponding to the program.

The transparent touch display 130 can include a touch-sensitive display for providing a touch input/output interface between the electronic device 100 and the user, in the front side and/or the back side of the electronic device 100. The transparent touch display 130 can be a medium for detecting the touch (or contact) in the front side and/or the back side of the electronic device 100 through a touch sensor, forwarding the detected touch input to the electronic device 100, and providing the visual output of the electronic device 100 to the user. In response to the touch input, the transparent touch display 130 can provide the user with the visual output based on text, graphics, and video.

The transparent touch display 130 can include a touch-sensitive surface for detecting the user's touch input, and sense the user touch input using haptic contact, tactile contact, or their combination. For example, the detected touch point of the transparent touch display 130 corresponds to a digit of a finger used to contact the touch-sensitive surface. On the touch-sensitive surface, the transparent touch display 130 detects the contact of an external device such as stylus pen. The detected contact can be converted to an interaction corresponding to the user interface (e.g., a soft key) displayed on the touch screen.

The transparent touch display 130 can enter the transparent state under the user's control and transparently display content or graphic element. That is, the transparent touch display 130 can transparently display the content in the front side so that an object at the back of the transparent touch display 130 is projected to the front side of the transparent touch display 130. The transparent touch display 130 may translucently display the content or the graphic element displayed in the front side by controlling brightness.

The transparent touch display 130 detects the touch of the external input device. The external input device indicates a device such as touch pen for, when the corresponding external input device contacts the transparent touch display 130, recognizing the corresponding contact as the touch in the electronic device 100.

Figure 1B:
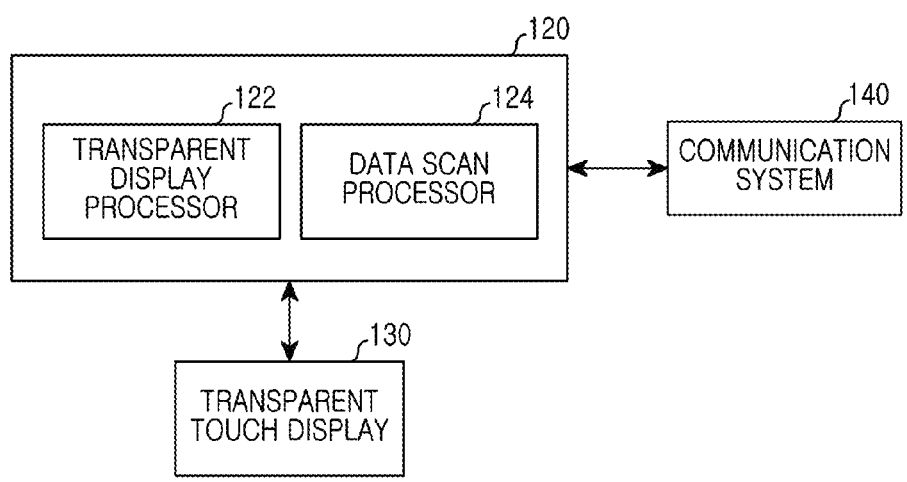
FIG. 1B illustrates a configuration of a processor for scanning the data according to an embodiment of the present invention.

FIG. 1B is a block diagram of a configuration of the processor for scanning the data according to an embodiment of the present invention.

Referring to FIG. 1B, the processor 120 includes a transparent display processor 122 and a data scan processor 124.

The transparent display processor 122 sets the scan mode of the electronic device 100 under the user control. For example, when the menu for setting the scan mode is selected, the transparent display processor 122 sets the scan mode of the electronic device 100. As another example, when the application for setting the scan mode is executed, the transparent display processor 122 sets the scan mode of the electronic device 100. As yet another example, when the gesture for setting the scan mode is detected, the transparent display processor 122 sets the scan mode of the electronic device 100. As yet another example, when the contact of the external input device is detected in the transparent region on the transparent display, the transparent display processor 122 sets the scan mode of the electronic device 100.

When the electronic device 100 is in the scan mode, the transparent touch processor 122 can make the transparent touch display 130 transparent. Here, the transparency means that the background behind the transparent touch display 130 is clearly visible through the front side of the transparent touch display 130. Particularly, in the scan mode, the transparent display processor 122 can make the preset region of the transparent touch display 130 transparent. More specifically, in the scan mode, the transparent display processor 122 can make the preset region of the transparent touch display 130 transparent according to the running application and/or function. For example, when the electronic device 100 is in the scan mode while running the web browser application, the transparent display processor 122 can make the region corresponding to the search word input window transparent in the transparent touch display 130 displaying the web browser application screen. As another example, when the electronic device 100 is in the scan mode while running the launcher application, the transparent display processor 122 can make the whole region of the transparent touch display 130 transparent.

When the electronic device 100 is in the scan mode, the transparent display processor 122 can make the transparent touch display 130 translucent. Here, the translucency indicates the intermediate state between the transparent state where the background behind the transparent touch display 130 is clearly visible through the front side of the transparent touch display 130 and the opaque state where the background behind the transparent touch display 130 is invisible through the front side of the transparent touch display 130. In the scan mode, the transparent display processor 122 can make the preset region of the transparent touch display 130 translucent. More specifically, in the scan mode, the transparent display processor 122 can make the preset region of the transparent touch display 130 translucent according to the running application and/or function. For example, when the electronic device 100 is in the scan mode while running the web browser application, the transparent display processor 122 can make the region corresponding to the search word input window translucent in the transparent touch display 130 displaying the web browser application screen. As another example, when the electronic device 100 is in the scan mode while running the launcher application, the transparent display processor 122 can make the whole region of the transparent touch display 130 translucent.

When detecting the touch from the external input device, the data scan processor 124 obtains the coordinates of the detected touch region. When the electronic device 100 is in the scan mode and the touch of the external input device is detected in the transparent or translucent region, the data scan processor 124 obtains the coordinates of the detected touch.

The data scan processor 124 receives the scanning data from the external input device via the communication system 140. That is, when the touch of the external input device is detected, the data scan processor 124 receives the scanning data from the corresponding external input device using the wireless communication currently connected to the electronic device 100. When the electronic device 100 is not currently connected to the external input device using the wireless communication, the data scan processor 124 displays the wireless communication list of the available wireless communication networks for the current external input device.

When a particular wireless communication network is selected in the displayed wireless communication list, the data scan processor 124 connects to the external input device over the selected wireless communication network and then receives the scanning data from the external input device. The data scan processor 124 can connect the wireless communication by automatically selecting the wireless communication network based on the preset priority of the wireless communication networks.

The data scan processor 124 displays the scanning data received from the external input device, on the transparent touch display 130. More specifically, upon receiving the scanning data from the external input device, the data scan processor 124 obtains the coordinates of the detected touch from the external input device and displays the received scanning data in the touch area corresponding to the obtained touch coordinates on the transparent touch display 130. The data scan processor 124 can opaquely display the scanning data on the transparent touch display 130 which is transparent or translucent. Particularly, the data scan processor 124 can determine whether the scan mode of the electronic device ends and continuously display the scanning data until the scan mode ends under the user control.

The data scan processor 124 displays the scanning data in the display region determined by the touch coordinates detected from the external input device. That is, when detecting the touch from the external input device, the data scan processor 124 obtains the coordinates of the corresponding touch, determines that the region within the threshold distance from the touched coordinates is to display the scanning data, and then displays the scanning data in the corresponding region. When the display region of the scanning data overlaps, the data scan processor 124 displays the scanning data only once in the overlapping region. More specifically, the data scan processor 124 displays the first scanning data. To display the second scanning data, the data scan processor 124 then determines the first region which displays the first scanning data and the second region which is to display the second scanning data. Thus, the data scan processor 124 determines whether the first region and the second region overlap with each other. The data scan processor 124 displays at least one of the first scanning data and the second scanning data in the overlapping region.

The data scan processor 124 can determine the scanning data received until the end of the detected touch, as one image. That is, the data scan processor 124 can determine the scanning data continuously received during the detected touch of the external input device, as one image. For example, when the drag of the external input device is detected, the data scan processor 124 determines the scanning data during the corresponding drag, as one image. The data scan processor 124 controls to move, copy, paste, and delete the scanning data determined as one image.

The data scan processor 124 can determine the scanning data received until the motion of the electronic device 100 is detected, as one image. More specifically, when no motion of the electronic device 100 is detected and the scanning data is continuously received, the data scan processor 124 can determine the multiple scanning data received, as one image. For example, when the motion of the electronic device 100 is not detected until the touch of the external input device ends, the data scan processor 124 determines the scanning data received until the motion of the electronic device 100 is detected, as one image. The electronic device 100 is assumed to include the sensor (i.e., the motion sensor) for detecting the motion of the electronic device 100.

When receiving the size information of the scanning data from the external input device, the data scan processor 124 displays the data based on the received size information. This is to make the size of data shown through the transparent touch display 130 identical with the size of data displayed on the transparent touch display 130.

Figure 1C:
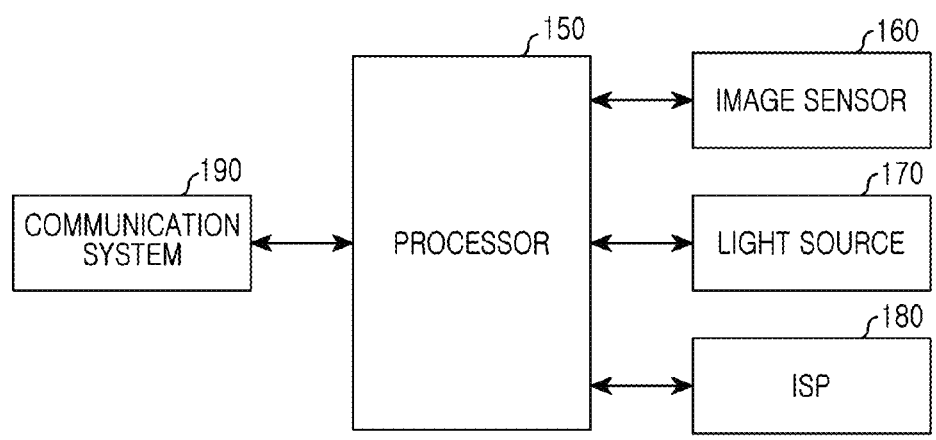
FIG. 1C illustrates a configuration of an external input device for scanning the data according to an embodiment of the present invention.

FIG. 1C is a block diagram of a configuration of the external input device for scanning the data according to an embodiment of the present invention.

Referring to FIG. 1C, the external input device includes a processor 150, an image sensor 160, a light source 170, an Image Signal Processor (ISP) 180, and a communication system 190.

The processor 150 processes and controls the data scanning and the data communication, scans the data, and sends the scanning data to the electronic device 100 under control of the electronic device 100.

The image sensor 160 includes a photo diode or a laser diode. The image sensor 160 scans data of an external device or data of an external document and provides the scanning data to the processor 150 under control of the processor 150. The image sensor 160 can employ a camera for inputting the data to scan.

When the image sensor 160 of the external input device scans the data, the light source 170 outputs the light of brightness for facilitating the data scanning. The light source 170 may not belong to the external input device according to the design.

The ISP 180 processes the data scanned by the image sensor 160 to data ready to be sent using the wireless communication. According to the design, the ISP 180 can belong to at least one of the electronic device 100 and the external input device.

The communication system 190 encodes a signal fed from the processor 150, sends the encoded signal to the electronic device 100 using short-range wireless communication, decodes a signal received through the short-range wireless communication, and sends the decoded signal to the processor 150. Here, the short-range wireless communication includes, for example, Bluetooth, Wireless Local region Network (WLAN), Ultra WideBand (UWB), and Infrared Data Association (IrDA). When using the IrDA of the short-range wireless communication, a transmitter can employ an IRDA Light Emitting Diode (LED), and a receiver can employ an IRDA photo diode.

Figure 2A:
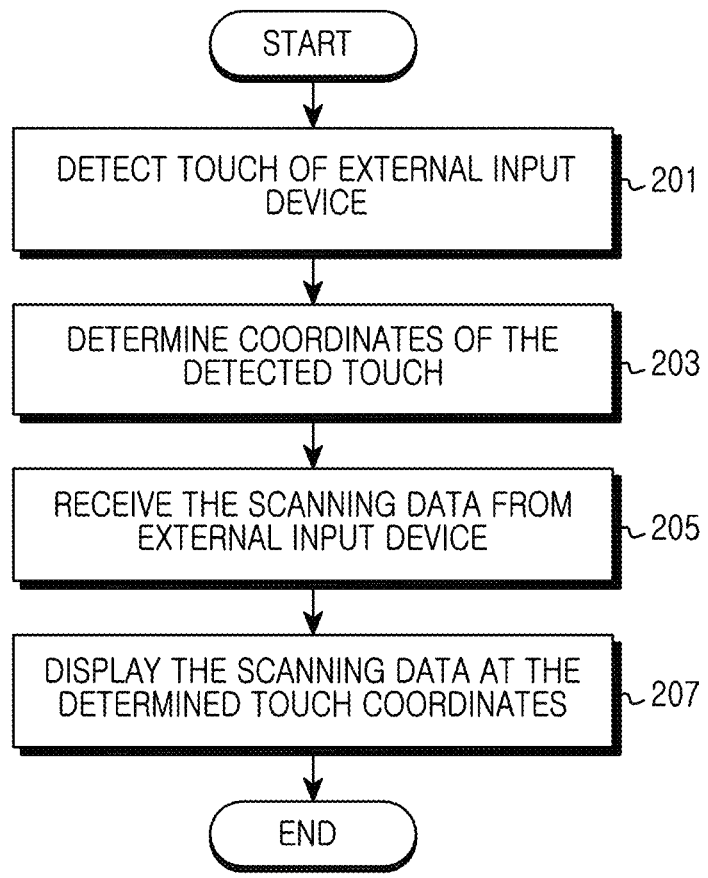
FIG. 2A illustrates a method for scanning the data in the electronic device according to an embodiment of the present invention.

FIG. 2A illustrates a method for scanning the data in the electronic device 100 according to an embodiment of the present invention.

Referring to FIG. 2A, the electronic device 100 detects the touch of the external input device in step 201 and determines the coordinates of the detected touch in step 203. It is assumed that the electronic device 100 can project the object behind the electronic device 100 through the display of the electronic device 100.

In step 205, the electronic device 100 receives the scanning data from the external input device. That is, the electronic device 100 receives the scanning data from the external input device through the wireless communication currently connected. It is assumed that the electronic device 100 and the external input device support at least one identical wireless communication network.

In step 207, the electronic device 100 displays the scanning data at the determined touch coordinates. The electronic device 100 can opaquely display the scanning data on the display. The electronic device 100 can determine and display the scanning data as the text data or the image data.

FIG. 2B illustrates means for performing a method for scanning the data in the electronic device 100 according to one embodiment of the present invention.

Referring to FIG. 2B, the electronic device 100 includes a means 211 for detecting the touch of the external input device. The electronic device 100 can include a means for making the display of the electronic device 100 transparent or translucent under the user control.

The electronic device 100 includes a means 213 for determining the coordinates of the detected touch and a means 215 for receiving the scanning data from the external input device. The electronic device 100 can include a wireless communication system for connecting at least one wireless communication.

The electronic device 100 includes a means 217 for displaying the scanning data at the determined touch coordinates. The electronic device 100 can include the motion sensor for detecting the motion of the electronic device 100, and a means for determining the scanning data received while the motion of the electronic device 100 is detected, as one image. The electronic device 100 can include a means for opaquely displaying the scanning data.

Figure 3:
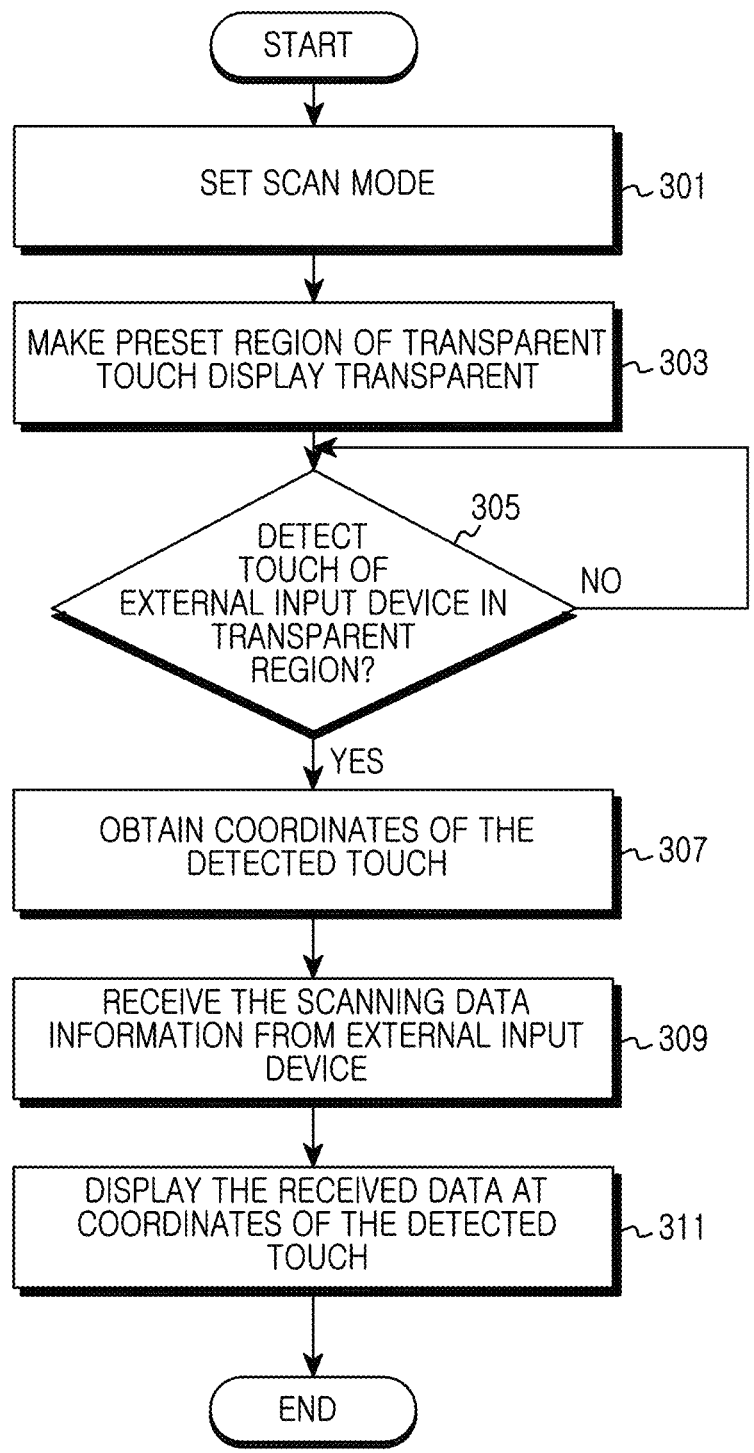
FIG. 3 illustrates a method for scanning the data using a transparent display in the electronic device according to an embodiment of the present invention.

FIG. 3 illustrates a method for scanning the data using the transparent display in the electronic device 100 according to an embodiment of the present invention. FIGS. 4A-4B, 5A-5B, 6A-6B, 7A-7B, 8A-8B and 9A-9D are examples illustrating the method shown in FIG. 3.

Figure 4A:
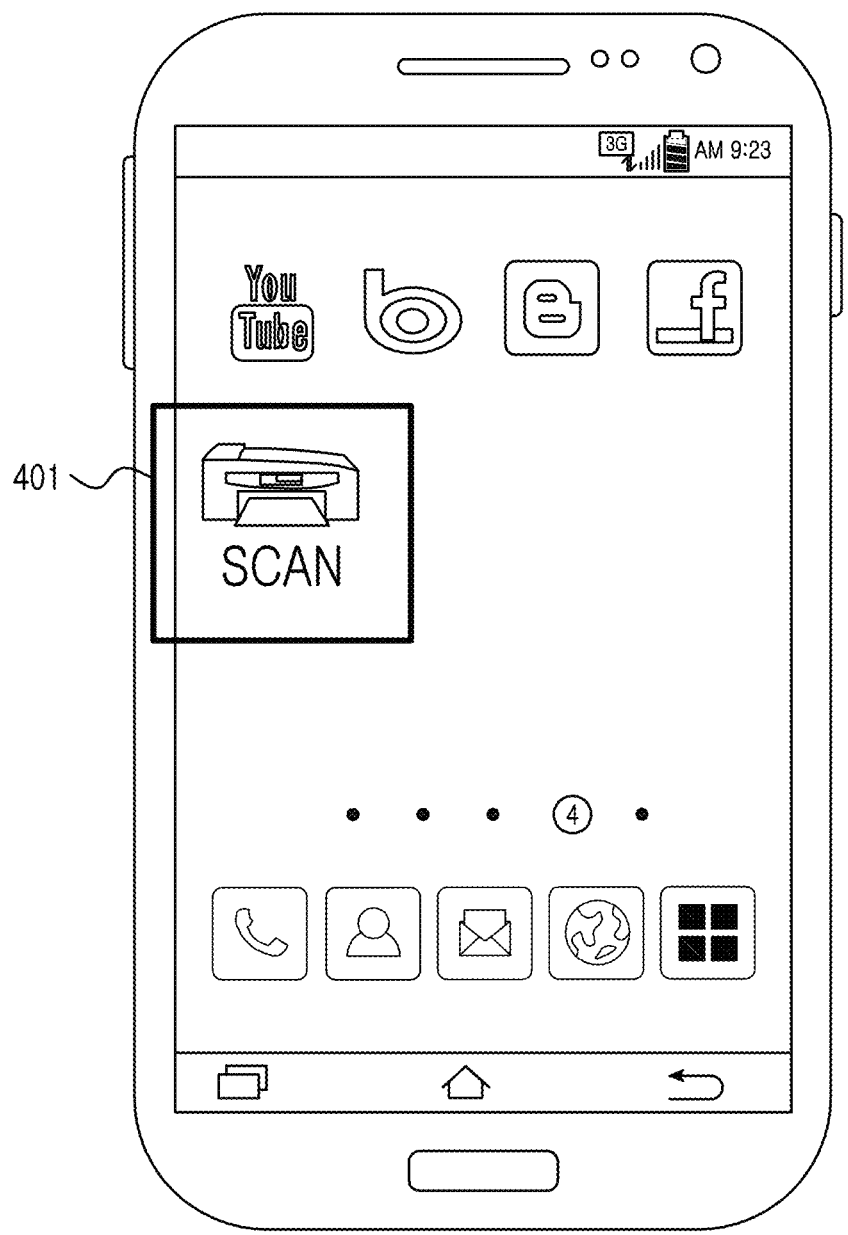
FIGS. 4A and 4B illustrate setting a scan mode of the electronic device according to an embodiment of the present invention.
Figure 4B:
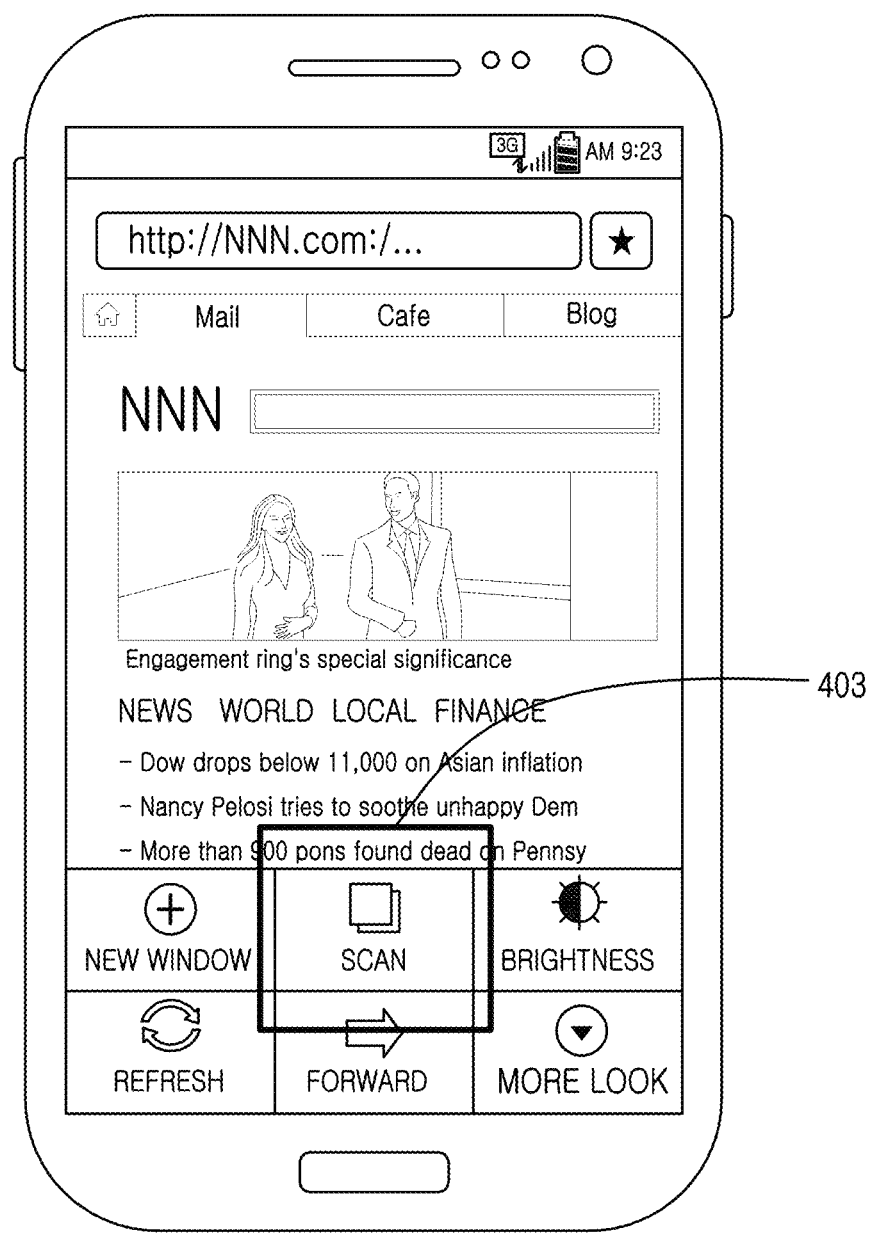

Referring to FIG. 3, the electronic device 100 sets the scan mode in step 301. For example, when an application 401 for setting the scan mode of the electronic device 100 is executed as shown in FIG. 4A, the electronic device 100 can set the scan mode through a menu. When a menu 403 for setting the scan mode of the electronic device 100 is selected as shown in FIG. 4B, the electronic device 100 can set the scan mode.

Figure 5A:
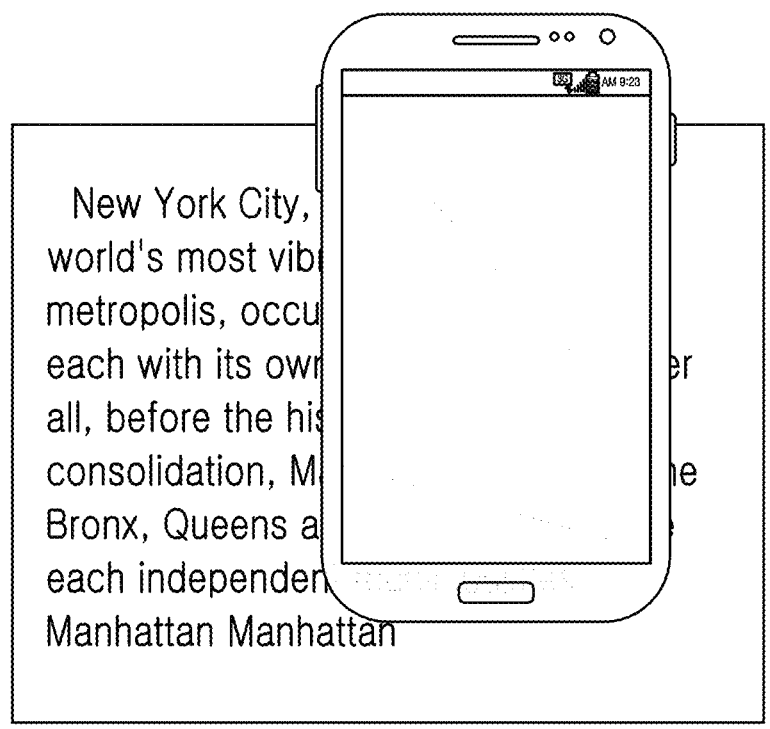
FIGS. 5A, 5B, 6A and 6B illustrate making a preset region transparent in the electronic device according to an embodiment of the present invention.
Figure 5B:
Figure 6A:
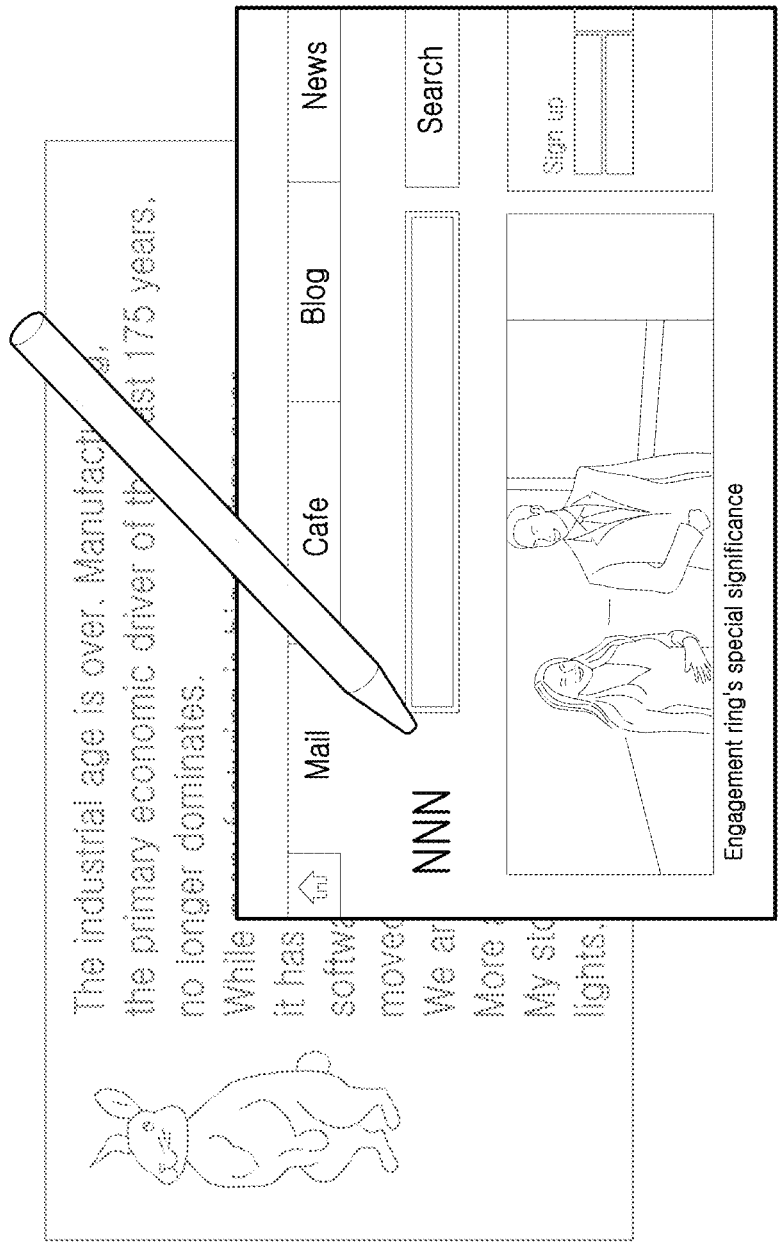
Figure 6B:
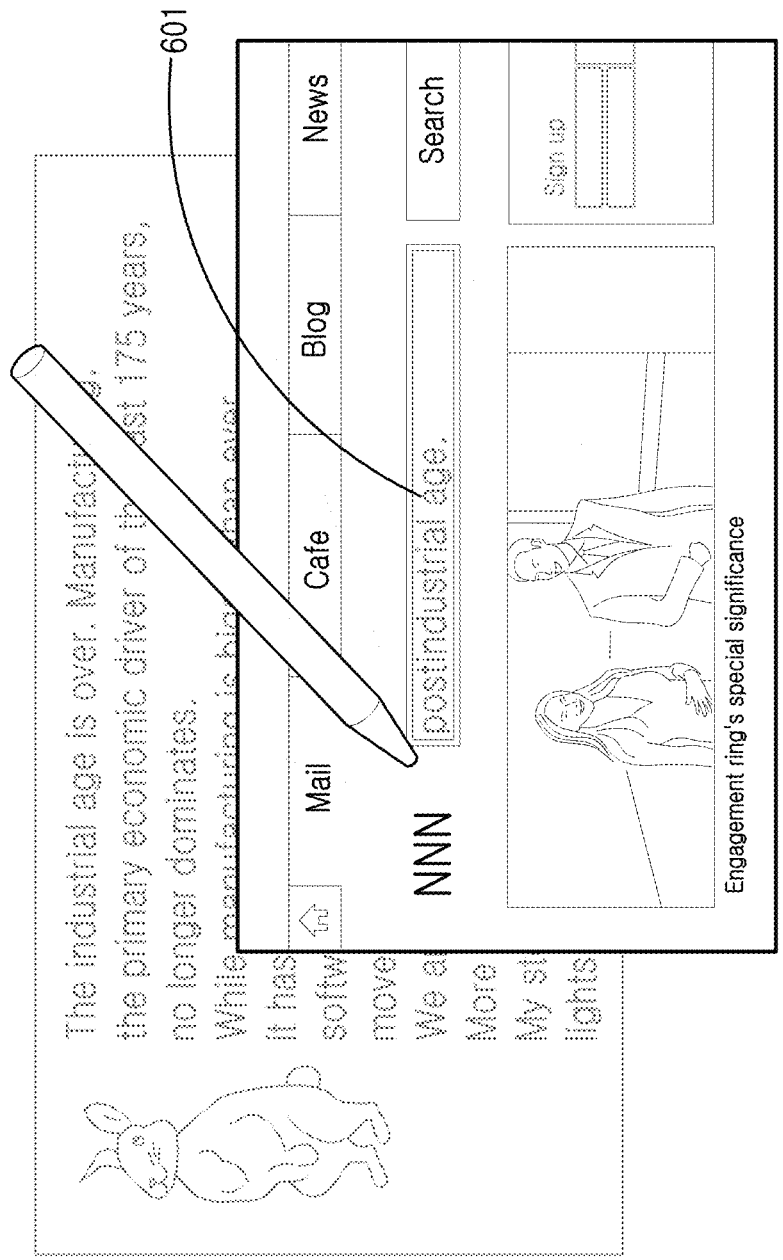

In step 303, the electronic device 100 makes the preset region of the transparent touch display 130 transparent. Here, the transparency means that the background behind the transparent touch display 130 is clearly visible through the front side of the transparent touch display 130. More specifically, in the scan mode, the electronic device 100 can make the preset region of the transparent touch display 130 transparent according to the running application and/or function. For example, when the transparent touch display 130 of the electronic device 100 is opaque in the scan mode as shown in FIG. 5A, the electronic device 100 makes the whole region 501 of the transparent touch display 130 transparent as shown in FIG. 5B. As another example, when the transparent touch display 130 of the electronic device 100 displays the web browser and the transparent touch display 130 is opaque in the scan mode as shown in FIG. 6A, the electronic device 100 makes the search word input window 601 of the web browser transparent as shown in FIG. 6B. The user can view part of the data, "postindustrial age", behind the electronic device 100 through the transparent search word input window 601.

In step 305, the electronic device 100 detects the touch of the external input device in the transparent region.

When not detecting the touch of the external input device in the transparent region, the electronic device 100 returns to step 305.

Upon detecting the touch of the external input device in the transparent region, the electronic device 100 obtains the coordinates of the detected touch in step 307. The electronic device 100 can store the coordinate information of the detected touch of the external input device. That is, in response to the touch of the external input device, the electronic device 100 can confirm the coordinates of the touch and store all the information about the confirmed coordinates.

In step 309, the electronic device 100 receives the scanning data information from the external input device. That is, the electronic device 100 can receive the scanning data information of the external input device over the wireless communication network linking the electronic device 100 and the external input device. The scanning data information can be the data scanned by the external input device, or the data processed by the ISP of the external input device to display the scanning data of the external input device as the text data or the image data in the electronic device 100. When receiving the data scanned by the external input device, the electronic device 100 processes the data scanned by the external input device using the ISP to display it as the text data or the image data.

Figure 7A:
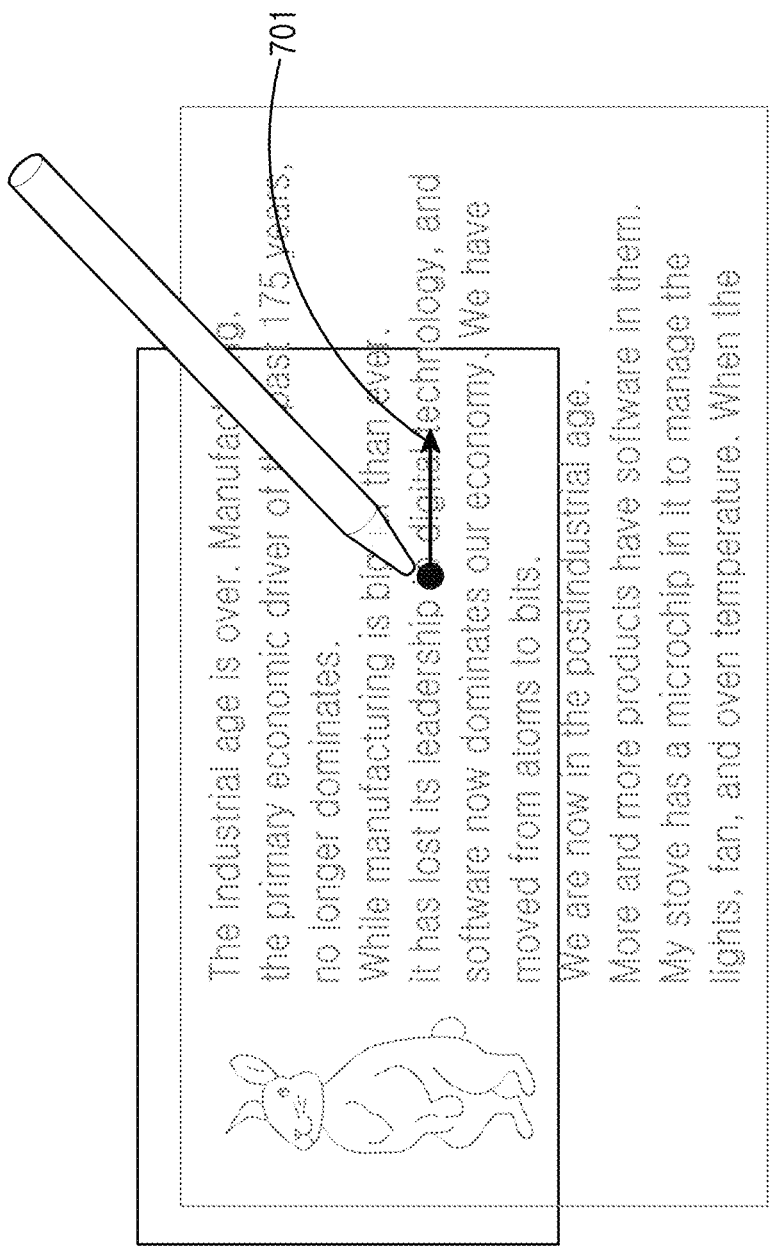
FIGS. 7A through 7B and 8A through 8B illustrate scanning text data displayed in the electronic device according to an embodiment of the present invention.
Figure 7B:
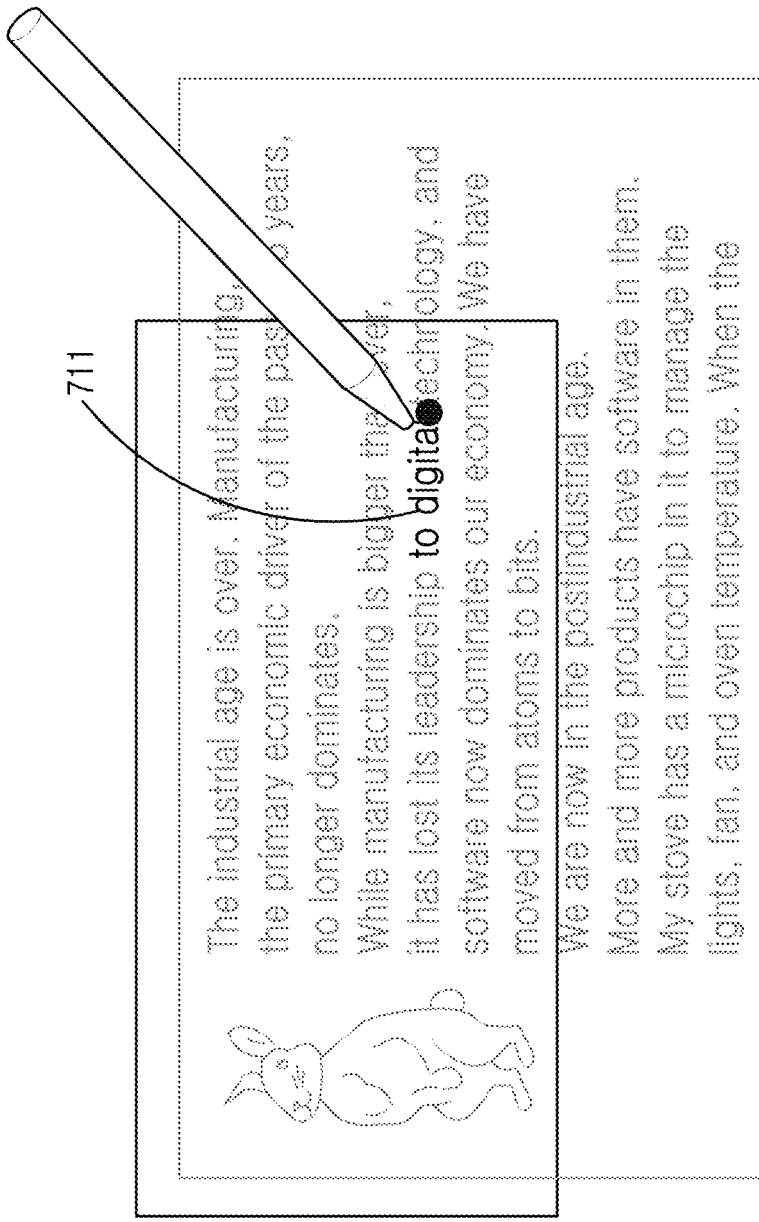

In step 311, the electronic device 100 displays the received data at the coordinates of the detected touch. That is, the electronic device 100 can display the received scanning data at the coordinates of the detected touch of the external input device. The electronic device 100 can determine and display the scanning data as the text data or the image data. For example, when detecting the drag 701 of the external input device in the region corresponding to the text "to digital" as shown in FIG. 7A, the electronic device 100 displays the scanning text "to digital" 711 in the drag region as shown in FIG. 7B.

Figure 8A:
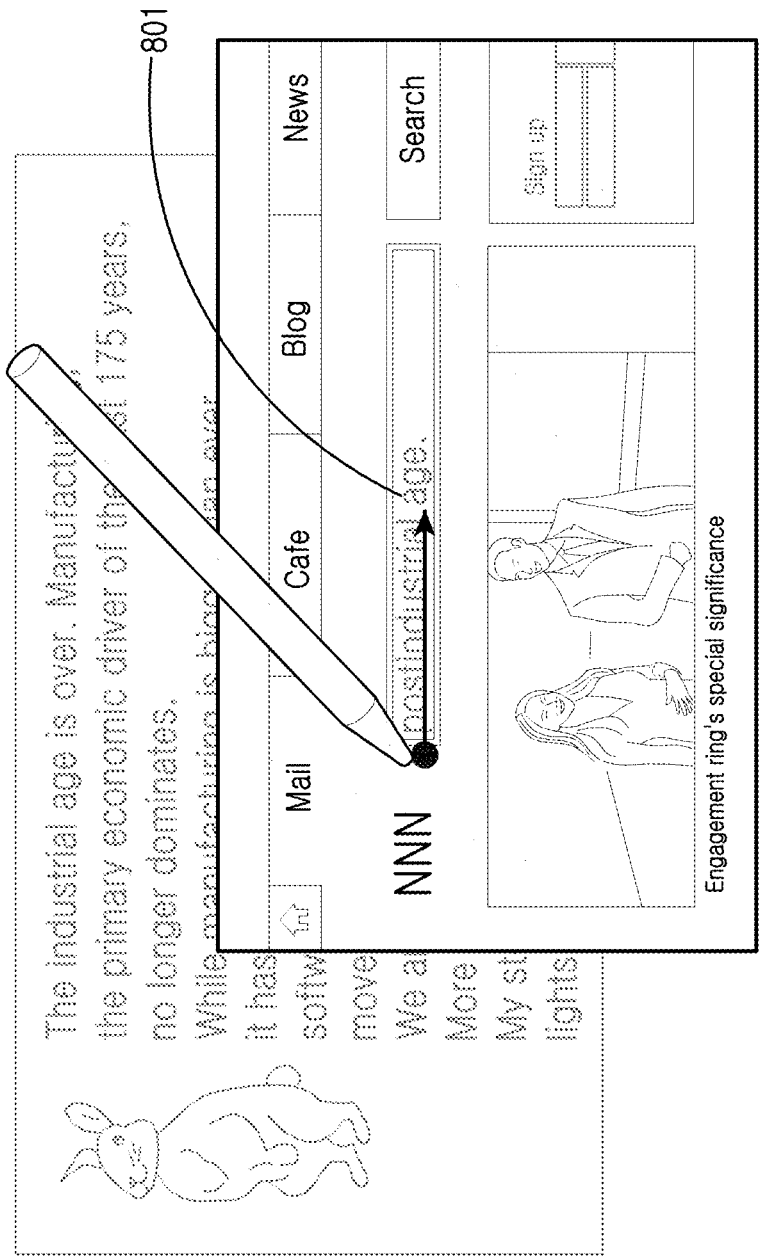
Figure 8B:
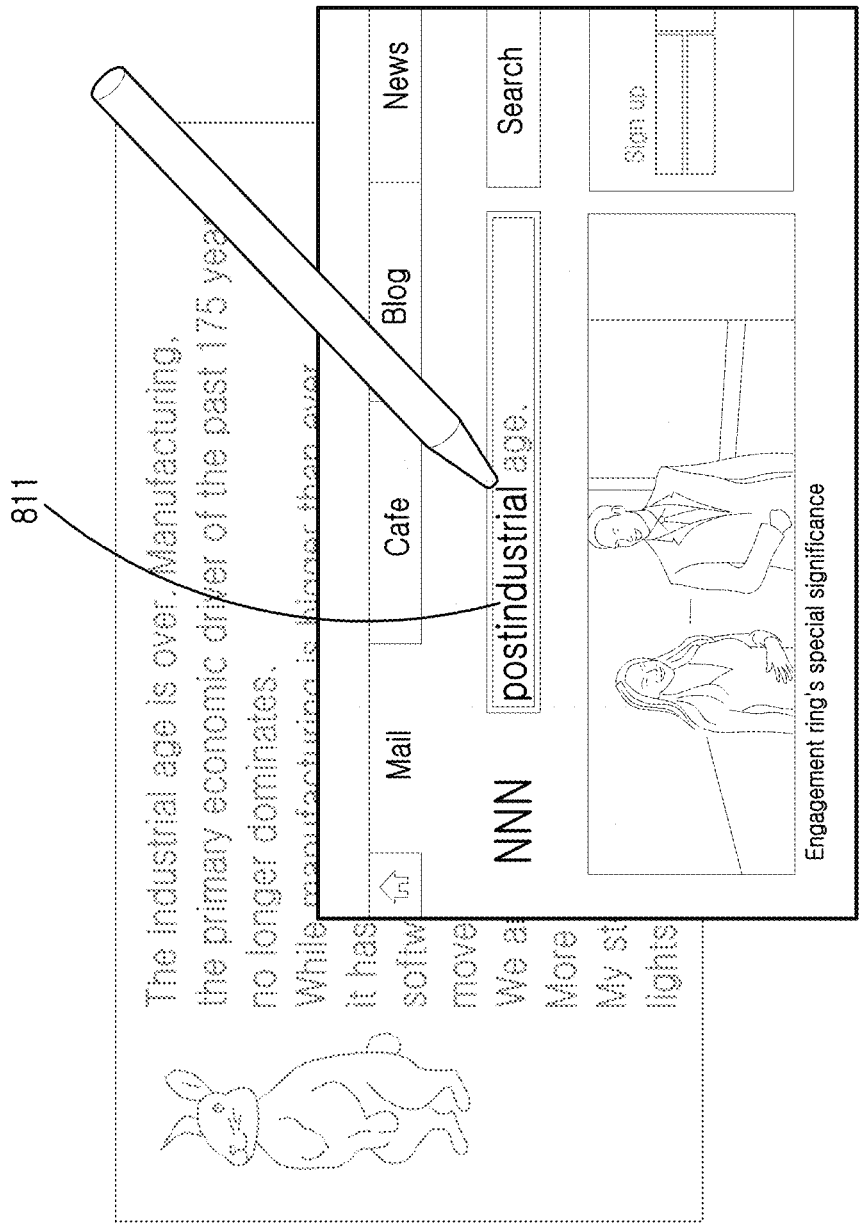

When the display region of the scanning data allows the text input, the electronic device 100 can input the text based on the scanning data in the scanning data display. For example, when detecting the drag 801 of the external input device in the region corresponding to the text "postindustrial" of the search word input window as shown in FIG. 8A, the electronic device 100 inputs the scanning text "postindustrial" 811 in the search word input window according to the detected drag as shown in FIG. 8B.

Figure 9A:
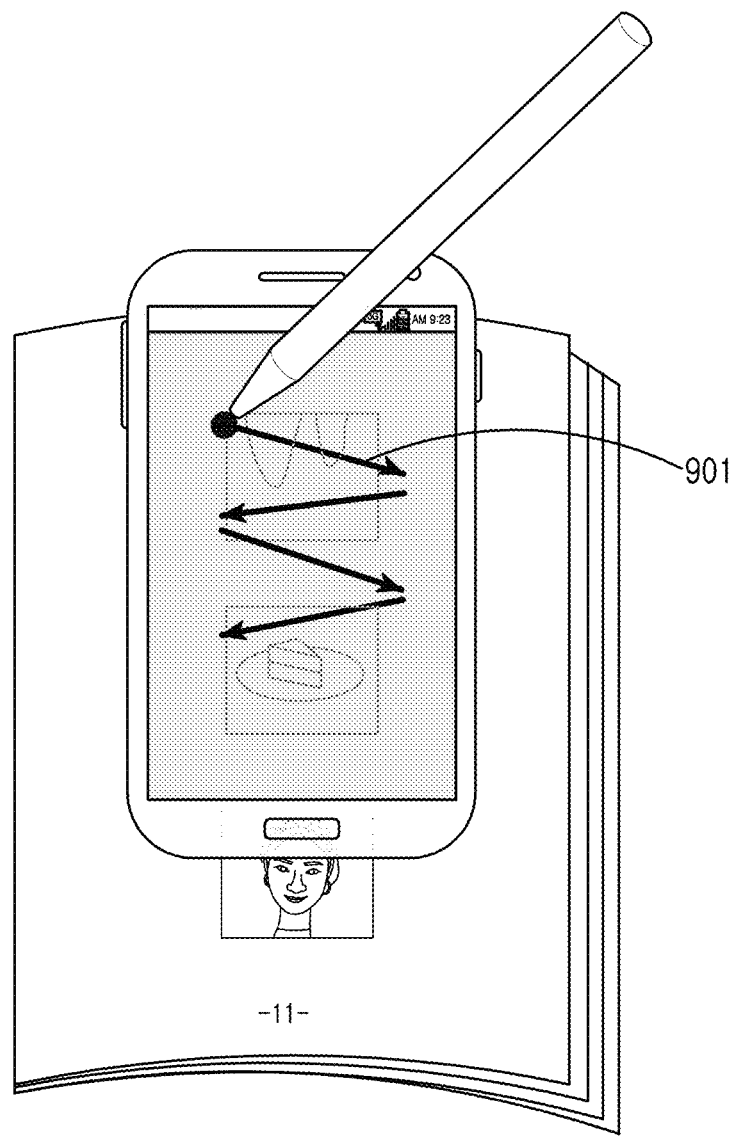
FIGS. 9A through 9D illustrate scanning image data displayed in the electronic device according to an embodiment of the present invention.
Figure 9B:
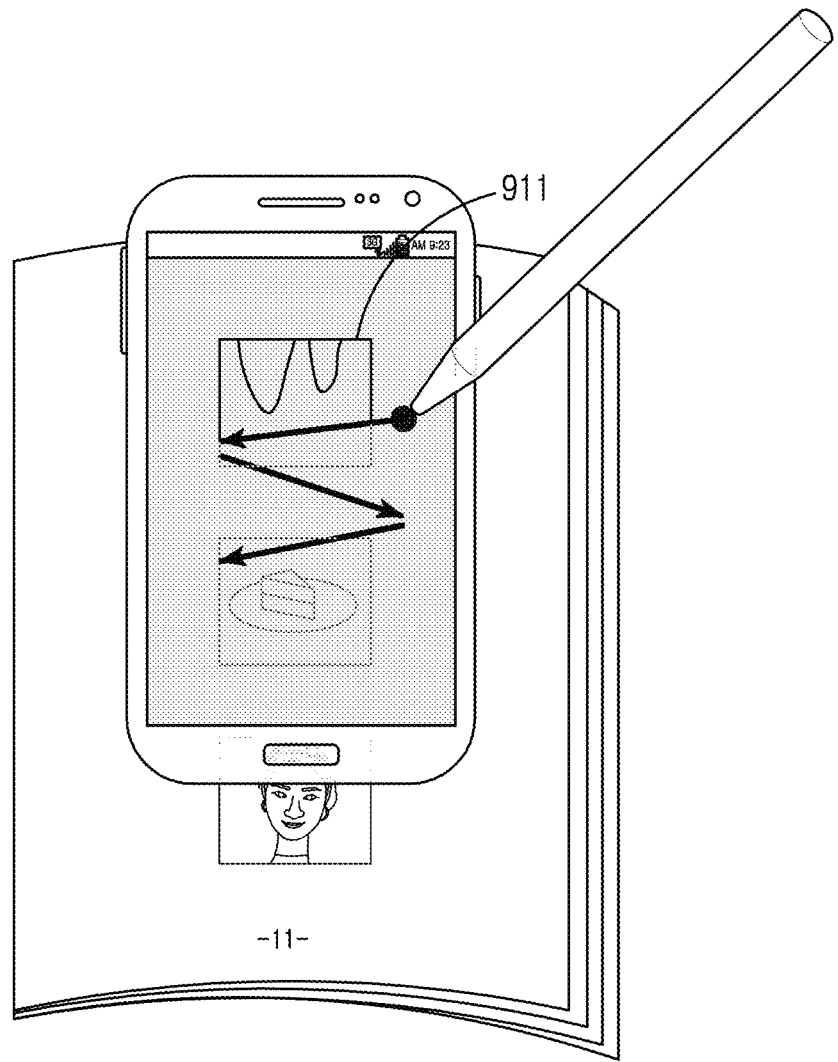

When displaying the image data scanned by the external input device, the electronic device 100 can display an image within a threshold distance based on the coordinates of the detected touch of the external input device. For example, when detecting the drag 901 of the external input device in the image region as shown in FIG. 9A, the electronic device 100 displays the image data in the drag region 911 as shown in FIG. 9B.

Figure 9C:
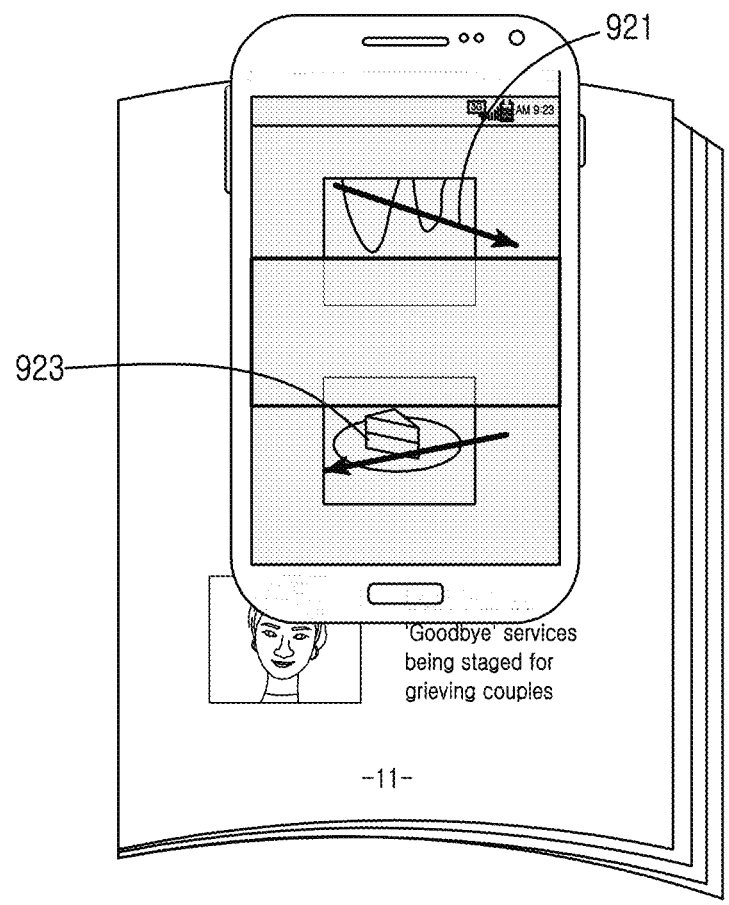

The electronic device 100 can determine the scanning data received until the motion of the electronic device 100 is detected, as one image and then display the determined image. For example, when detecting no motion of the electronic device 100 during two drags 921 and 923 as shown in FIG. 9C, the electronic device 100 determines two images displayed based on the two drags 921 and 923 as the single image, rather than the independent images. When detecting the drag in the middle of the image region without the motion of the electronic device 100, the electronic device 100 determines three images as the single image.

Figure 9D:
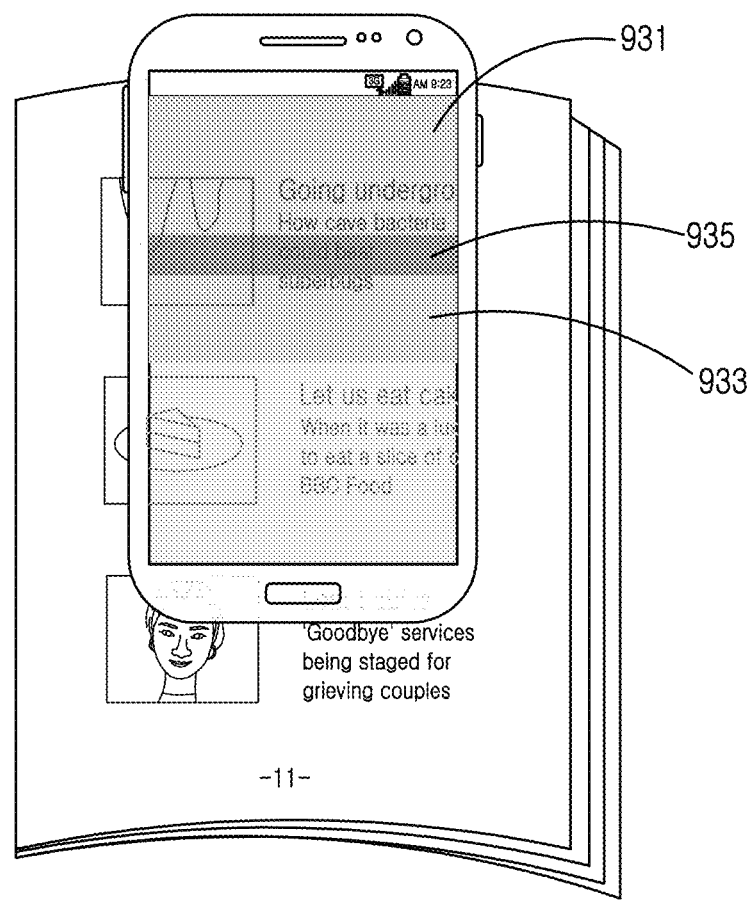

When at least two drags are detected and the display region of the scanning data overlaps, the electronic device 100 can display the scanning data only once in the overlapping region. More specifically, when displaying the first scanning data and then displaying the second scanning data, the electronic device 100 can determine the first region which displays the first scanning data and the second region which is to display the second scanning data, and thus determine whether the first region and the second region overlap with each other. In so doing, the electronic device 100 can display at least one of the first scanning data and the second scanning data in the overlapping region. For example, when the first region 931 and the second region 933 for displaying the scanning image data include the overlapping region 935 as shown in FIG. 9D, the overlapping region 935 displays the image data just once.

As set forth above, in the scan mode, the electronic device makes the preset region of the display transparent. When detecting the touch of the external input device in the transparent region, the electronic device receives the scanning data from the external input device and displays the received scanning data at the coordinates of the detected touch. Thus, the electronic device can more easily scan the data using the characteristics of the transparent display.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Further, such programs may be conveyed electronically via any medium such as a communication signal carried over a wired or wireless connection and embodiments suitably encompass the same.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method in an electronic device, the method comprising:
    displaying an application screen including a plurality of graphic user interfaces (GUIs) comprising one or more input fields on a touch display having light transmissivity;
    detecting a touch by an external touch input unit, wherein the touch display has the light transmissivity such that an object can be seen through the touch display;
    receiving a touch input associated with a touch detected at the one or more input fields by the touch display;
    receiving visual information of the object from the external touch input unit, wherein the visual information is obtained by the external touch input unit through the touch display while the external touch input unit is inputting the touch detected at the one or more input fields; and
    inputting the received visual information or data corresponding to the received visual information to the one or more input fields.

2. The method of claim 1, further comprising:
    setting a scan mode of the electronic device; and
    when the scan mode of the electronic device is set, making a preset region of the touch display of the electronic device having the light transmissivity.

3. The method of claim 2, wherein the preset region is determined based on at least one of a running application or an executed function.

4. The method of claim 1, wherein receiving the visual information of the object from the external touch input unit comprises:
    receiving the visual information processed by an Image Signal Processor (ISP) of the external touch input unit from the external touch input unit.

5. The method of claim 1, further comprising:
    processing the visual information received from the external touch input unit in an ISP of the electronic device.

6. The method of claim 1, further comprising:
    detecting whether the detected touch ends; and
    determining the visual information received until the end of the detected touch, as one image.

7. The method of claim 1, further comprising:
    detecting a motion of the electronic device; and
    determining the visual information received until the motion the electronic device is detected, as one image.

8. The method of claim 1, further comprising:
    determining whether a scan mode of the electronic device ends; and
    when the scan mode of the electronic device does not end, continuously displaying the inputted visual information until the scan mode of the electronic device ends.

9. The method of claim 1, wherein inputting the received visual information or the data corresponding to the received visual information to the one or more input fields comprises:
    determining a display region based on the one or more input fields; and
    displaying the visual information in the determined display region.

10. The method of claim 9, wherein displaying the visual information in the determined display region comprises:
    confirming a first region which displays first visual information;
    confirming a second region which is to display second visual information; and
    when the first region and the second region overlap with each other, displaying at least one of the first visual information and the second visual information in the overlapping region.

11. An electronic device comprising:
    a touch display operatively coupled to one or more processors and configured to display an application screen including a plurality of graphic user interfaces (GUIs) comprising one or more input fields and to detect a touch by an external touch input unit or a finger, wherein the touch display has light transmissivity such that an object can be seen through the touch display; and
    the one or more processors configured to:
    receive visual information of the object from the external touch input unit, wherein the visual information is obtained by the external touch input unit through the touch display while the external touch input unit is inputting the touch detected at the one or more input fields; and
    input the received visual information or data corresponding to the received visual information to the one or more input fields.

12. The electronic device of claim 11, wherein the one or more processors are further configured to set a scan mode of the electronic device, and when the scan mode of the electronic device is set, make a preset region of the touch display of the electronic device having the light transmissivity.

13. The electronic device of claim 12, wherein the preset region is determined based on at least one of a running application or an executed function.

14. The electronic device of claim 11, wherein the one or more processors are further configured to receive the visual information processed by an Image Signal Processor (ISP) of the external touch input unit from the external touch input unit.

15. The electronic device of claim 11, further comprising an Image Signal Processor (ISP), wherein the one or more processors are further configured to process the visual information from the external touch input unit in the ISP of the electronic device.

16. The electronic device of claim 11, wherein the one or more processors are further configured to detect whether the detected touch ends, and determine the visual information received until the end of the detected touch, as one image.

17. The electronic device of claim 11, further comprising:
a motion sensor,
wherein the one or more processors are further configured to detect a motion of the electronic device, and determine the visual information received until the motion of the electronic device is detected, as one image.

18. The electronic device of claim 11, wherein the one or more processors are further configured to determine whether a scan mode of the electronic device ends, and when the scan mode of the electronic device does not end, continuously display the inputted visual information until the scan mode of the electronic device ends.

19. The electronic device of claim 11, wherein the one or more processors are further configured to determine a display region based on the one or more input fields, and display the visual information in the determined display region.

20. A non-transitory computer-readable recording medium comprising a program for:
displaying an application screen including a plurality of graphic user interfaces (GUIs) comprising one or more input fields on a touch display having light transmissivity; and
detecting a touch by an external touch input unit, wherein the touch display has the light transmissivity such that an object can be seen through the touch display;
receiving a touch input associated with a touch detected at the one or more input fields by the touch display;
receiving visual information of the object from the external touch input unit, wherein the visual information is obtained by the external touch input unit through the touch display while the external touch input unit is inputting the touch detected at the one or more input fields; and
inputting the received visual information or data corresponding to the received visual information to the one or more input field.

* * * * *